July 5, 1960
W. A. HYLAND ET AL
2,943,692
HITCH DEVICES-BACK-UP HITCH FOR PLOW PRESS DRILL
Filed Dec. 20, 1957
3 Sheets-Sheet 1
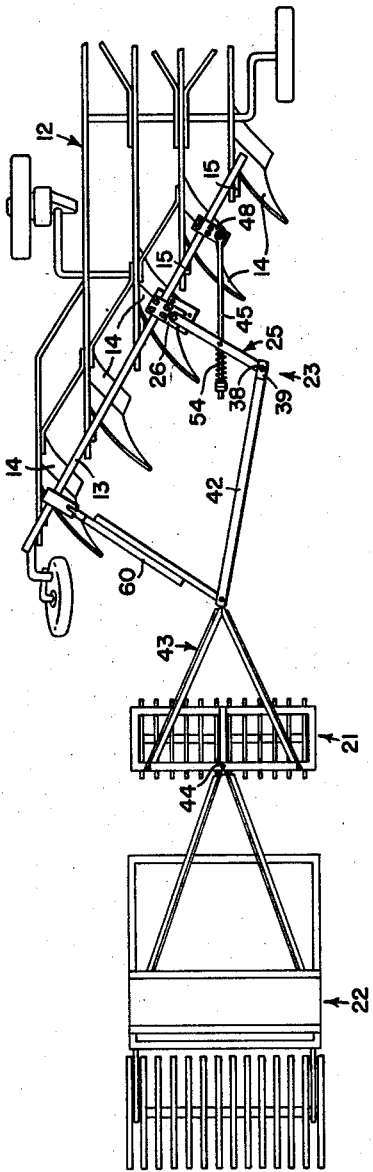
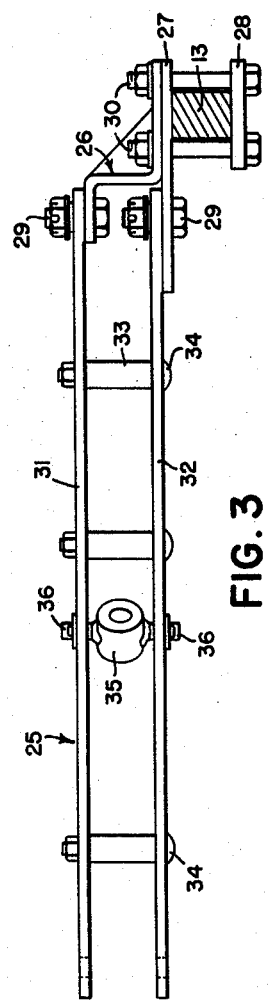
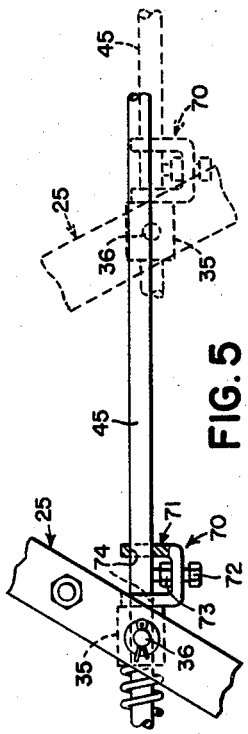
INVENTORS.
WILLIAM A. HYLAND
ARNOLD E. WELCK
BY
ATTORNEYS

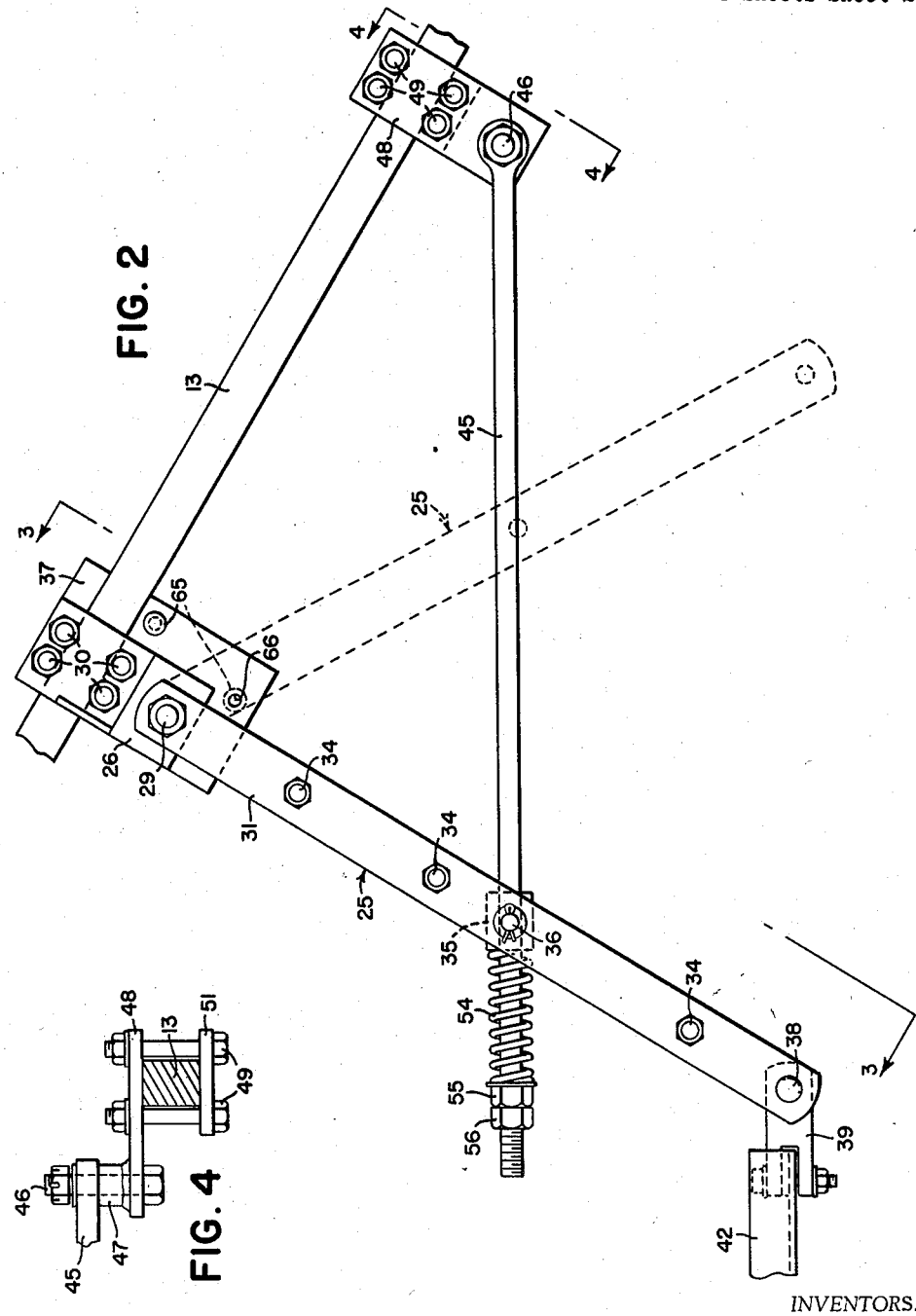

July 5, 1960  W. A. HYLAND ET AL  2,943,692
HITCH DEVICES-BACK-UP HITCH FOR PLOW PRESS DRILL
Filed Dec. 20, 1957  3 Sheets-Sheet 3

INVENTORS.
WILLIAM A. HYLAND
ARNOLD E. WELCK
BY
ATTORNEYS

2,943,692

United States Patent Office

Patented July 5, 1960

2,943,692

HITCH DEVICES—BACK-UP HITCH FOR PLOW PRESS DRILL

William A. Hyland and Arnold E. Welck, Horicon, Wis., assignors, by mesne assignments, to Deere & Company, a corporation of Delaware Filed Dec. 20, 1957, Ser. No. 704,030

1 Claim. (Cl. 172—657)

The present invention relates generally to agricultural implements and more particularly to tractor-implement outfits, particularly those incorporating a tractor plow with a pulverizer-packer trailing the plow and a grain drill trailing the pulverizer-packer.

The object and general nature of the present invention is the provision of a new and improved hitching arrangement that accommodates backing the tractor and plow relative to the associated implements, such as for the purpose of resetting a tripped plow bottom, without interfering with any of the implement-propelling connection. More specifically, it is a feature of this invention to provide a hitch device particularly adapted for use with plows of the type in which each plow bottom is connected with the plow frame through a safety trip, incorporating means whereby any plow bottom can swing backwardly when it encounters an obstruction or for some other reason is subjected to an overload, and in which after a plow bottom has been tripped, the same may be restored to operative position by backing the plow through a limited distance. Further, the hitch means of the present invention is so constructed and arranged as not to interfere with the proper action of any of the plow safety trips when any one or more of them encounter an obstruction or other overload.

These and other objects and advantages of the present invention will be apparent to those skilled in the art after a consideration of the following detailed description, taken in conjunction with the accompanying drawings, in which:

Fig. 1 is a plan view of a tractor-implement outfit in which the principles of the present invention have been incorporated, somewhat diagrammatic in character.

Fig. 2 is an enlarged fragmentary plan view of the principal parts of the hitch.

Fig. 3 is a fragmentary sectional view taken generally along the line 3—3 of Fig. 2.

Fig. 4 is a fragmentary sectional view taken generally along the line 4—4 of Fig. 2.

Fig. 5 is a fragmentary plan view showing a modified form of transport lock.

Figure 6:
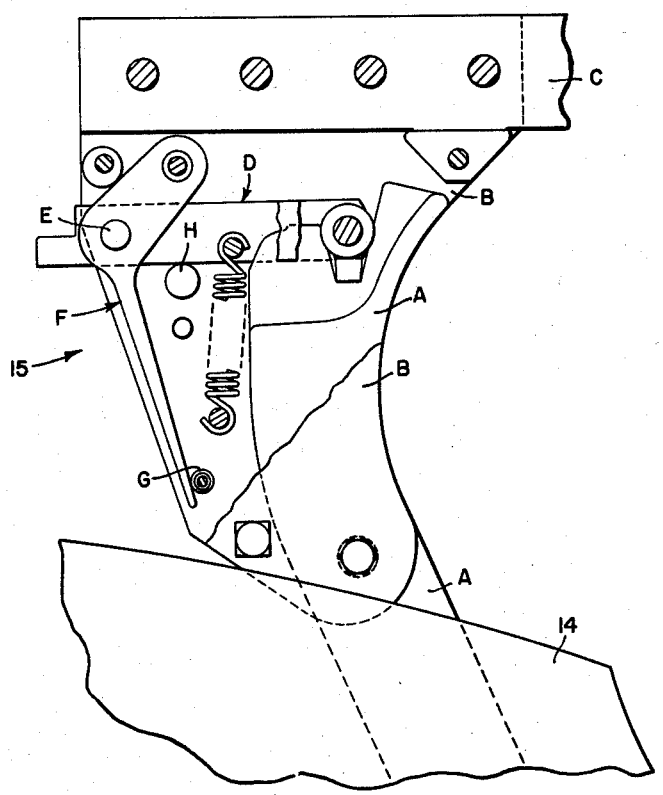
Fig. 6 is an explanatory side view of the overload trip means.

Referring first to Fig. 1 a propelling tractor (not shown but generally of conventional construction) is connected to propel a multi-bottom plow 12 in the usual manner. The plow 12 includes frame means, generally in the form of a diagonal bar 13 to which a plurality of plow bottoms 14 are connected by overload releasable trip means 15. This invention is not particularly concerned with the details of the trip means, which may, for example, be similar to the releasable mechanism shown in U.S. Patent 2,775,182, issued December 25, 1956, to Walter H. Silver, to which reference may be made if desired. Briefly, as shown in Fig. 6, each of the safety trip means 15 comprises overload responsive mechanism that includes a standard A pivoted to depending brackets B fixed to each of the frame beams C of the plow. The upper end of each standard A releasably receives a link D that is pivoted at E to a leaf spring F that is pivoted to the associated brackets B, to which the lower end of the spring F is anchored by an abutment G. When the spring F yields, as under an overload, the pivot E moves downwardly and forwardly, rocking the link D about a strike pin or abutment H, which raises the forward end of the link D out of engagement with the upper end of the pivoted standard A.

Thus, the releasing mechanism is such that, when an overload is encountered, as by the plow bottom striking an obstruction, the standard carrying the plow bottom is released from the supporting structure and the standard with plow bottom fixed thereto swings generally rearwardly and upwardly so that the plow may pass over the obstruction. After a plow bottom has been tripped, the same may be restored to operative position merely by backing the plow through a relatively limited extent, after which the safety trip automatically reengages and plowing may be resumed.

The trailing implements in the tractor-implement outfit shown in the drawings comprise a pulverizer-packer 21 and a grain drill 22 having conventional furrow openers and associated individual press wheels. With an outfit of this kind, the operator may plow, pulverize, plant seed, and pack the soil over the seed, and the grain drill and pulverizer-packer are connected in draft-transmitting relation with the plow 12 by hitch means 23 that is particularly constructed and arranged to accommodate the aforesaid backing of the plow 12 for the purpose of restoring a tripped plow to its normal operating position. It will be understood that if the conventional grain drill, such as the implement 22, is backed with the furrow openers in the ground, the openers would plug up with soil and the grain drill rendered substantially inoperative. Hence, it is imperative, when backing the plow to restore one or more tripped bottoms to their normal operating position, that the grain drill remain in the position that is occupied when the outfit was stopped after the obstruction was encountered and the tripping of the overload release means occurred. The hitch of this invention also includes means to lessen the shock on the packer and drill when starting the outfit after the plow has been backed and the tripped bottom or bottoms restored to operative position.

The hitch structure 23 comprises a generally transversely extending arm 25 pivotally connected with the plow beam 13. The means connecting the inner end of the arm 25 to the plow beam 13 comprises a bracket 26 bolted to the beam 13 by means of upper and lower clamping plates 27 and 28, the upper clamping plate 27 being extended to form a part of the pivotal connecting means and the upper portion of the bracket 26 and the aligned portion of the clamping plate 27 being apertured to receive pivot bolts 29. The arm 25 includes upper and lower bars 31 and 32, the inner ends of which are apertured to receive the pivot bolts 29. The bars 31 and 32 are maintained in vertically spaced relation by spacers 33 and associated bolts 34. At a mid-point of the arm 25, the bars 31 and 32 are apertured to receive a sleeve 35 carrying trunnions 36 that are rockably disposed in the openings in the upper and lower arm bars 31 and 32. The laterally outer ends of the arm bars 31 and 32 carry a pivot 38 to which the forward end of the packer clevis 39 is swingably connected, the clevis 39 forming a part of the connection between the arm 25 and a hitch bar 42 that extends rearwardly to the packer hitch 43. The grain drill 22 is pivotally hitched to the frame of the packer 21, as indicated at 44.

It will be seen from Fig. 3 that the arm 25 is mounted generally above the level of the plow frame beam 13, and hence there is no likelihood of a plow bottom, when tripped swinging upwardly and striking the arm 25 or the rod 45. The arm and/or rod may therefore be adjusted to substantially any position required along the beam 13.

Draft is transmitted between the plow frame and the associated implements by means of a tension rod 45 that is pivotally connected at its forward end with the plow beam 13. To this end, the forward end of the rod 45 is apertured to receive a pivot bolt 46 that is carried in a short sleeve or bushing 47 fixed, as by welding, to an upper clamping plate 48. Bolts 49 serve to fix a lower clamping plate 51 and the upper clamping plate 48 to the plow beam at the proper point thereon, the pivot 46 serving to prevent any fore-and-aft movement of the tension rod 45 relative to the plow. The rear end portion of the tension rod 45 extends slidably through the swivelled sleeve 35 and at its rear end receives a shock absorbing spring 54, the forward end of which bears against the rear end of the sleeve 35 while the rear end of the spring 54 reacts against an adjusting nut 55 that is held in a position of adjustment by a lock nut 56, the rear end of the tension rod 45 being threaded so as to receive nuts 55 and 56. A stabilizing bar 60 is extended laterally between the rear portions of the plow and the forward portion of the packer hitch frame 43, preferably at the point where the rear portion of the packer hitch bar 42 is connected with the packer hitch frame. The function of the stabilizer bar is to hold the end of the packer hitch in proper alignment, but any lateral displacement of the outer end of the swinging hitch arm 25 is accommodated by the permissive lateral swinging of the packer hitch bar 42 relative to the packer hitch frame 43.

The above-described structure, incorporating the principles of the present invention, operates substantially as follows:

The tractor pulls the plow 12, and draft is transmitted from the frame of the plow rearwardly through the tension rod 45 to the arm 25, and from the latter end of the arm 25 to the packer hitch frame through the hitch bar 42. If one of the plow bottoms of the plow 12 should strike an obstruction, the associated trip means releases the plow bottom and the latter swings rearwardly so as to permit the plow to pass over the obstruction. The operator then stops the outfit and backs the tractor so as to restore the tripped plow bottom to its operating position. In so backing the tractor, the grain drill and packer remain in their stopped position and the pivoted arm 25 swings forwardly relative to the plow frame about the pivots 29. During this action, the sleeve 35 slides forwardly along the tension rod 45 to about the position shown in dotted lines in Fig. 2. After the tripped plow bottom has been reconnected, the tractor is started and plowing resumed. The arm 25 then swings rearwardly along the tension rod 45 until the sleeve 35 comes into contact with the cushioning spring 54, after which the packer and grain drill are then drawn forwardly. Thus, the swinging hitch, together with the associated cushion spring, serves to absorb the shock that would otherwise be imposed on the packer and drill when starting the outfit after the plow has been backed.

When the outfit is transported from field to field, along lines, highways, etc., a transport pin 65 (Fig. 2) is moved from its full line position over into a hole 66 in the outer portion of the plate 37 where the pin 65, dotted lines, is adapted to keep the drill and packer from running ahead of the plow. When plowing the pin is retained in a hole in the plate adjacent the beam 13, as shown in full lines.

A modified form of transport lock is shown in Fig. 5 and may be used to take the place of the locking pin 65, described above. Instead of the transport pin 65, we may provide a locking member 70 mounted directly on the rod 45. The member 70 includes U-shaped clip 71, carrying a set screw 72 that is threaded into the intermediate portion of the clip 71 and receives a lock nut 73. The end portions of the member 71 are apertured as at 74 to receive the rod 45 in a position such that the set screw 72 when tightened bears against the rod 45 and holds the member 70 against movement relative thereto. The set screw 72 may be held in locked position by the lock nut 73.

When it is desired to transport the outfit, the locking member 70, with the set screw 72 loosened, is slid from its dotted line position rearwardly until it is in contact with the sleeve 35, as indicated in full lines. Then the set screw 72 and the lock nut 73 are tightened. In transport, therefore, the member 70 prevents the arm 25 from swinging forwardly and thus prevents the grain drill and/or packer from overrunning the plow. During plowing, however, the forward swinging of the arm 25 must be accommodated, as shown in Fig. 2, and therefore the unit 70 is loosened and shifted forwardly along the rod 45 to the position indicated in dotted lines in Fig. 5, after which the set screws 72 are retightened to hold the locking member 70 in its inoperative or plowing position.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

In a plow and trailing implement, wherein the plow is of the type having a plurality of plow bottoms, each provided with a safety trip standard adapted to swing rearwardly under overload conditions, the combination therewith of a hitch connecting the implement with said plow, said hitch comprising a transverse arm pivotally connected adjacent one end with the plow, rigid link means connected at its forward end with said plow, draft transmitting means connecting the rear portion of said link means with said transverse arm, said draft transmitting means including means accommodating permissive forward swinging of said transverse arm relative to said link means, and transport lock means comprising a member releasably attachable to said link means and shiftable thereon from a position immediately forward of said transverse arm so as to prevent forward swinging of the latter relative to said link means to a position forwardly toward the forward end of said link means so as to accommodate the aforesaid permissive forward swinging.

References Cited in the file of this patent

UNITED STATES PATENTS

| | | |
|---|---|---|
| 869,056 | Burton | Oct. 22, 1907 |
| 1,679,628 | Roby | Aug. 7, 1928 |
| 1,960,132 | Wright | May 22, 1934 |
| 2,540,677 | Kandt et al. | Feb. 6, 1951 |
| 2,726,097 | Darrough | Dec. 6, 1955 |
| 2,775,182 | Silver | Dec. 25, 1956 |
| 2,780,478 | Forsyth | Feb. 5, 1957 |